(12) United States Patent
Laroia et al.

(10) Patent No.: US 7,639,728 B2
(45) Date of Patent: Dec. 29, 2009

(54) METHODS FOR GENERATING AND TRANSMITTING FREQUENCY HOPPED SIGNALS

(75) Inventors: Rajiv Laroia, Basking Ridge, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1049 days.

(21) Appl. No.: 10/616,143

(22) Filed: Jul. 8, 2003

(65) Prior Publication Data

US 2005/0025220 A1 Feb. 3, 2005

(51) Int. Cl.
*H04B 1/00* (2006.01)
(52) U.S. Cl. .................. 375/135; 375/136; 375/130; 375/260; 375/299; 375/347; 375/349; 375/146; 375/147; 455/501; 455/502
(58) Field of Classification Search .................. 375/136, 375/133, 130, 135, 260, 299, 347, 349, 146, 375/147; 370/342; 398/182; 455/501, 502; 379/61; 371/42
See application file for complete search history.

(56) References Cited

U.S. PATENT DOCUMENTS 5,323,447 A * 6/1994 Gillis et al. .................. 455/464

(Continued)

FOREIGN PATENT DOCUMENTS

EP 0 982 906 A 1/2000

(Continued)

OTHER PUBLICATIONS

R. Pervez and M. Nakagawa, "Parallel Coded Optical Multicarrier Frequency Division Multiplexing—A Potential Step Towards High Speed, High Capacity and High Reliability in Optical Transmission Systems", IEICE Transactions on Communications, V. E79 B, No. 11, pp. 1677-1686, Nov. 1996.

(Continued)

*Primary Examiner*—Shuwang Liu
*Assistant Examiner*—Kabir A Timory
(74) *Attorney, Agent, or Firm*—Michael P. Straub; James K. O'Hare

(57) ABSTRACT

Methods and apparatus for generating and transmitting frequency division multiplexed signals are described. The methods are well suited for use where a device uses a small subset, M, of a larger set of N subcarrier frequencies at any given time. Each transmitted FDM signal is generated by combining a plurality of individual analog subcarrier signals whose frequency may change, e.g., be hopped as a function of time. Each generated analog subcarrier signal is amplified, e.g., power amplified, and filtered prior to being combined with other analog subcarrier signals. Filters are used to compensate for or correct signal distortions and/or reduce interference between subcarriers. Fixed frequency filters are used in an exemplary frequency hopping OFDM system. In another embodiment, the filters are programmable and change, e.g., in terms of center frequency, to match the selected subcarrier frequency as frequency hopping occurs. The bandwidth of the programmable filters may remain constant.

26 Claims, 6 Drawing Sheets

U.S. PATENT DOCUMENTS

| | | | |
|---|---|---|---|
| 5,852,630 A * | 12/1998 | Langberg et al. | 375/219 |
| 5,915,210 A | 6/1999 | Cameron et al. | |
| 6,061,405 A | 5/2000 | Emami | |
| 6,088,381 A | 7/2000 | Myers | |
| 6,215,810 B1 | 4/2001 | Park | |
| 6,549,784 B1 * | 4/2003 | Kostic et al. | 455/501 |
| 7,002,934 B2 * | 2/2006 | Dolgonos et al. | 370/328 |
| 7,068,703 B2 * | 6/2006 | Maric | 375/136 |
| 7,224,742 B2 * | 5/2007 | Cleveland et al. | 375/260 |
| 2003/0123383 A1 * | 7/2003 | Korobkov et al. | 370/208 |
| 2003/0147655 A1 * | 8/2003 | Shattil | 398/182 |

FOREIGN PATENT DOCUMENTS

| | | |
|---|---|---|
| WO | WO 00/01084 | 1/2000 |
| WO | WO 02/23848 | 3/2002 |

OTHER PUBLICATIONS

J. Vankka, M. Kosunen, J. Hubach, and K. Halonen; "A Cordic-based Multicarrier QAM Modulator", Global Telecommunications Conference—Globecom '99, General Conference (Part A), pp. 173-177.

International Search Report, PCT/US2004/021411 -.International Search Authority - US, Jan. 26, 2006.

Written Opinion, PCT/US2004/02141-1 - International Search Authority - US, Jan. 26, 2006.

Supplementary European Search Report, EP04756621 - The Hague, Jan. 15, 2009.

* cited by examiner

METHODS FOR GENERATING AND TRANSMITTING FREQUENCY HOPPED SIGNALS

FIELD OF THE INVENTION

The present invention is directed to methods and apparatus for communicating information and, more particularly, to methods and apparatus for generating and transmitting frequency division multiplexed signals.

BACKGROUND

In Frequency Division Multiplexing (FDM) communication systems, the available spectral bandwidth W is divided into a number of spaced sub-carriers, $f_1, \ldots, f_N$, which are used to transmit information. Specifically, information bits are first mapped to complex FDM symbols $B_1, \ldots, B_N$. The signal to be transmitted, S(t), is constructed by individually modulating those symbols onto the sub-carriers over an FDM symbol duration, that is, $$S(t) = \Sigma_{k=1}^{N} |B_k| \cos[2\pi f_k t + \theta_k],$$

where $|B_k|$ and $\theta_k$ are the amplitude and the phase of complex symbol $B_k$, respectively, and t is the time variable. Orthogonal Frequency Division Multiplexing (OFDM) is one particular example of FDM.

FIG. 1 illustrates a known system 100 for generating and transmitting an OFDM signal S(t). In the known system 100, a digital signal generator 112, generates a sequence of baseband discrete complex samples of S(t), which are then converted to an analog continuous signal through use of a digital-to-analog converter 114. The analog signal generated by the D/A converter 114 is passed through a low-pass filter (LPF) 115, mixed to the carrier frequency by mixer 116, amplified with a power amplifier 118, and finally transmitted over the communication channel 120. The LPF 115 is normally selected as a function of the frequency of the signal generated by the digital signal generator 112.

In the known system, information to be transmitted on sub-carriers is combined in the digital domain so that by the time digital to analog conversion occurs distinct sub-carrier symbols do not exist, e.g., separate symbols corresponding to different sub-carriers are not available to be subject to separate and distinct digital to analog conversion operations and/or separate analog signal processing operations.

One major drawback of the known OFDM signal generation technique is the high peak-to-average ratio of the transmitted signal to be amplified. Loosely speaking, the peak-to-average ratio is the ratio of the maximum and the average powers of a signal. In general, the signal reception capability depends on the average power of the signal. However, to avoid nonlinear distortion such as signal clipping, the power amplifier at the transmitter normally has to operate linearly across the full dynamic signal range of the generated signal. This usually requires use of a class A power amplifier. As a result of the linear nature of the power amplifier 118, the power consumption of the power amplifier mainly depends on the maximum transmission power. Hence, the peak-to-average ratio is an important measure of power consumption given the quality requirement of signal reception.

In the OFDM system 100, the analog signal to be amplified is the sum of many sinusoid waveforms, e.g., sub-carrier signal. Assuming complex OFDM symbols $B_1, \ldots, B_N$ are independent random variables, the analog signal at a given time instant will tend to be a Gaussian distributed random variable, which is well recognized to have a large peak-to-average ratio. Hence, the transmission of the OFDM signals generally consumes a significant amount of power, which is very undesirable, e.g., for mobile transmitters using battery as power supply. Various methods have been proposed to reduce the peak-to-average ratio of the OFDM signals. The basic ideas in these methods is to arrange complex symbols $B_1, \ldots, B_N$ appropriately to minimize the peak to average ratio. However, in such methods, the fundamental structure of signal transmission of combining sub-carrier signals first and then power amplifying the combined signal is normally the same as shown in FIG. 1.

In order to overcome some of the power amplification problems of the FIG. 1 system, a system such as the one shown in FIG. 2 was developed. FIG. 2 illustrates a frequency division multiplexer signal generation and transmission system capable of generating and transmitting OFDM signals. As illustrated in FIG. 2, information bits to be transmitted on various sub-carriers are first mapped to complex OFDM symbols $B_1, \ldots, B_N$, e.g., one symbol per sub-carrier for each symbol period, by a digital symbol generator (DSG) 202. Each OFDM symbol $B_k$ (where 1<k<N) is then modulated to a corresponding sub-carrier $f_k$ using a corresponding sinusoidal signal generator 214, 214' of signal generator module 204, thereby generating an analog sinusoid signal for one symbol duration for each sub-carrier. The symbol duration is equal to the inverse of the spacing between two adjacent sub-carriers, plus the duration of a cyclic prefix portion when present. Each complex OFDM symbol to be transmitted is used to convey information bits to be communicated.

In the FIG. 2 system, the sinusoid signal generators for each sub-carrier are fixed frequency signal generators. The signals ($SS_1$-$SS_N$) of the sub-carriers are power amplified individually. The amplification of individual sub-carrier signals is performed in parallel, e.g., by using different sub-carrier signal paths, each sub-carrier signal path including a single power amplification module 206, 206' and a corresponding fixed filter 218, 218'. Each of the fixed filters 218, 218' correspond to the particular subcarrier frequency of the subcarrier path and is used to reject high order harmonics relative to the frequency of the subcarrier to which the filter 218, 218' corresponds. In cases where the filters 218, 218' are implemented as bandpass filters, they will normally have a passband centered around the corresponding subcarrier frequency and a bandwidth corresponding to the distance between subcarrier frequencies. In such a case, if the subcarrier frequency spacing is $\Delta f$ the filter 218 will normally be a fixed filter with a center frequency centered around $f_1$ and a bandwidth of approximately $\Delta f$. Similarly, in such a case filter 218' corresponding to subcarrier N, will normally be a fixed filter with a center frequency centered around $f_N$ and a bandwidth of approximately $\Delta f$. Fixed filters are relatively inexpensive to implement while matching filter cutoff regions to particular subcarrier frequencies has the advantage of reducing noise and potential interference between subcarrier signals which are later combined exclude signals, e.g., high order harmonics or other signals.

The use of fixed filters of the type described in regard to the FIG. 2 system works well when subcarrier signal paths correspond to a single fixed frequency.

Unfortunately, it is often the case that the frequencies on which a particular device may want to transmit information can change with time. In the case of a mobile device such as a PDA or other mobile communications device, the subcarrier frequencies upon which the mobile device is to transmit at any given time may change due, e.g., to changes in channel transmission allocations and/or the use of frequency hopping schemes.

In the case of a base station where the same set of N subcarrier frequencies is used on a continuous basis to transmit data, e.g., to a plurality of mobile devices, it may be practical to use N dedicated fixed subcarrier amplification and filtering signal path as shown in FIG. 2. This is because all or most of the N subcarriers will be used at any given time, e.g., with the data intended for different mobile devices being directed to the particular subcarrier signal path that corresponds to the frequencies allocated to the particular intended mobile device at any point in time.

Unlike base stations, mobile devices often use, at any given time, a small subset, e.g., M, of the total N subcarrier frequencies used in a cell at any given time where N>M. From cost, size and other reasons such as weight, in various devices, but particularly mobile devices, it is often impractical to provide a separate dedicated transmitter subcarrier signal path, e.g., amplifier and filter, for each of N possible subcarrier signals. This is particularly the case when only a small subset, e.g., M, of potential subcarrier frequencies N, may be used for transmission purposes at any given time.

In view of the above discussion, there is a need for improved frequency division multiplexed signal generation and transmission techniques. While the techniques should provide for low peak-to-average power ratios and therefore improved energy efficiency during power amplification stages of signal generation they should also be practical in terms of hardware implementation and not require separate subcarrier signal paths for each potential subcarrier frequency which may be used. It is desirable that at least some of the new methods and apparatus be suitable for use with frequency hopping schemes and OFDM signals and that at least some methods be well suited for use in implementing mobile communications devices, e.g., at reasonable cost.

SUMMARY OF THE INVENTION

Figure 1:
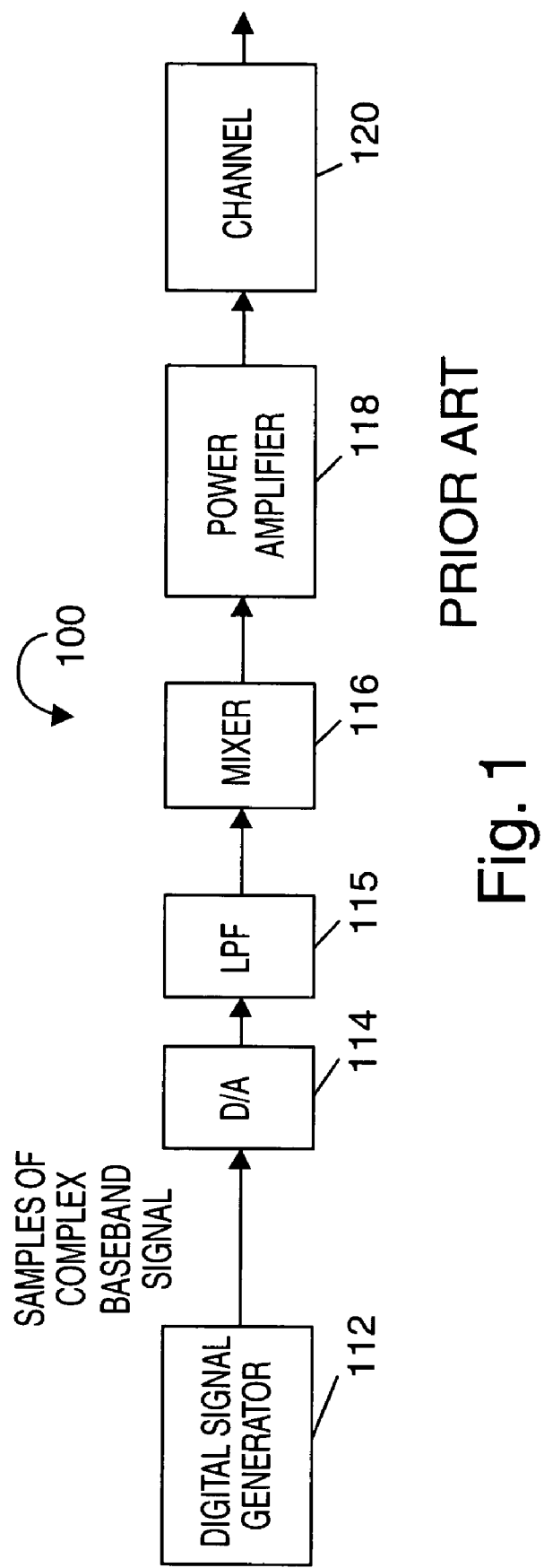
FIG. 1 illustrates a known system for generating and transmitting OFDM signals.
Figure 2:
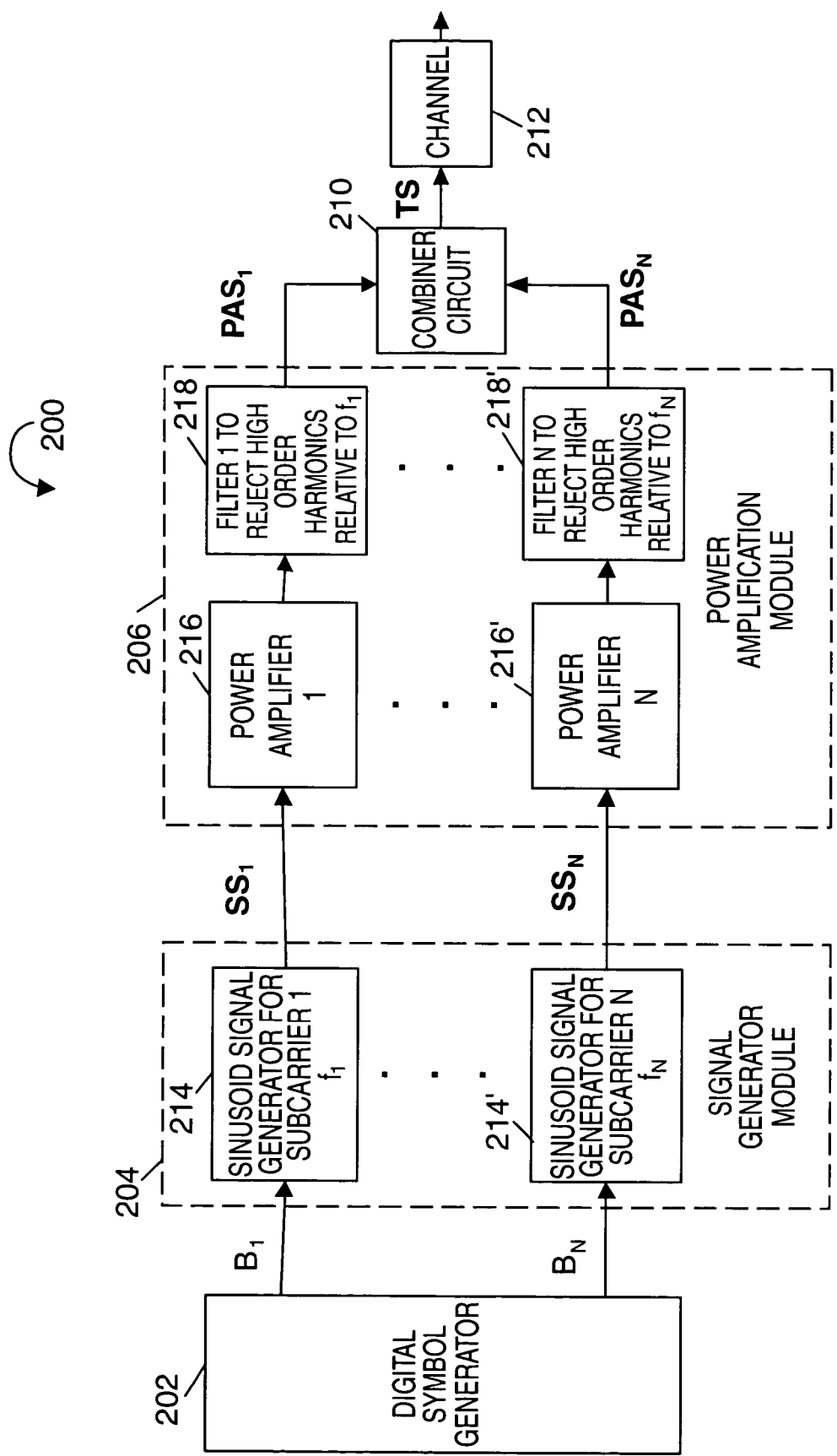
FIG. 2 illustrates a second known system for generating and transmitting OFDM signals.

The present invention is directed to frequency hopping transmission systems where signals are transmitted using a plurality of subcarrier signals. Various embodiments of the present invention are particularly well suited to orthogonal frequency division multiplexed (OFDM) systems. In OFDM systems subcarrier frequencies are carefully selected so that they do not interfere with one another. In many frequency hopping systems, individual mobile devices in a cell are allocated a subset, e.g., M, of possible subcarrier frequencies at any given time on which they can transmit signals. Thus, while mobile devices in a cell may use any of N subcarrier frequencies to transmit data over time in many systems during any given transmission period the mobile device may transmit on at most, M subcarrier frequencies where M<N.

In accordance with the present invention, a mobile device is provided with M different subcarrier amplification and filtering signal paths which the M signals, each corresponding to a different subcarrier frequency, being combined prior to transmission. As will be discussed below, rather than provide N different amplification and filtering paths, programmable signal generators are used in combination with programmable and/or fixed filters. At least one amplifier and filter is provided per subcarrier amplification and filtering signal path. In various embodiments, the circuitry on each subcarrier amplification and filtering path is the same with a control module determining the subcarrier frequency generated by signal generator on each individual subcarrier path.

In one embodiment, the filters are made programmable and are controlled by the frequency control module used to control the subcarrier signal generators. In such an embodiment the filter on each subcarrier signal path is controlled to be centered about, or at least pass, frequencies corresponding to frequency setting of the subcarrier signal generator on the same subcarrier signal path. In this manner, multiple subcarrier signal generation, amplification and filtering signal paths can be implemented using the same or similar programmable circuits which makes design an manufacturing relatively simple. Since the signal generation and filtering is programmable, any subcarrier signal path can be used for any subcarrier frequency allowing a device to implemented with M subcarrier signal amplification and filtering paths which is less than the number of subcarrier signal frequencies which are supported. When programmable power amplification circuits are used, different subcarrier signals can be subjected to different amounts of amplification prior to transmission if desired.

In one particular embodiment which uses fixed, as opposed to programmable filters on individual subcarrier signal amplification and filtering paths, each fixed filter used in a subcarrier signal path has a passband at least as wide as N times the frequency spacing between subcarrier signals. Such a wide filter allows any subcarrier amplification and filtering path to be used with any one of the N subcarrier frequencies which may need to be supported. Such an approach is particularly well suited for use with OFDM implementations since the individual subcarrier signals do not interfere significantly with one another. By using fixed filters having passbands corresponding to N times the subcarrier signal spacing $\Delta f$, the manufacturing and implementation advantages of using fixed filters on subcarrier signal amplification and filtering paths can be obtained without limiting the subcarrier signal paths to a particular subcarrier frequency.

In some embodiments, where providing the subcarrier filters with a passband N$\Delta f$ wide would provide insufficient filtering, a fixed filter with a passband at least X$\Delta f$ wide is provided for each of the subcarriers, where X is less N but some multiple of $\Delta f$. In such an embodiment, various subcarrier filters are provided with different center frequencies but each fixed filter is able to pass multiple subcarrier frequencies thereby allowing the programmable signal generator associated with the signal path to be changed from one subcarrier frequency to another, within limits imposed by the corresponding filter bandwidth, but avoiding the need for programmable filters. In one embodiment, X is equal to N divided by the number of M.

Thus, the various embodiments of the present invention allow devices to be implemented using different subcarrier signal amplification and filtering paths, the devices of the present invention are implemented in a cost and hardware efficient manner particularly in cases where a device is limited to using a subset of possible subcarrier frequencies at any point in time. While allowing for fixed filter implementations, the methods of the present invention still support programmable signal generators on subcarrier amplification and filtering signal paths while providing the power benefits associated with the use of separate power amplifiers for each of a plurality of different subcarrier signals.

DETAILED DESCRIPTION OF THE INVENTION

As discussed above, the present invention is directed to frequency hopping transmission systems where signals are transmitted using a plurality of subcarrier signals, each subcarrier corresponding to a different frequency. The methods and apparatus of the present invention are particularly well suited for use in mobile devices where, at any given time, the mobile device will normally use a subset, e.g., a small number, of the total number of subcarrier frequencies, e.g., tones, available for use in a cell by mobile devices. The tones may be used for transmitting signals, e.g., data and/or control information, to a base station. Various embodiments are directed to frequency hopping implementations and, in some implementations, frequency hopping OFDM systems which can take advantage of various fixed frequency filter features of some embodiments.

Figure 3:
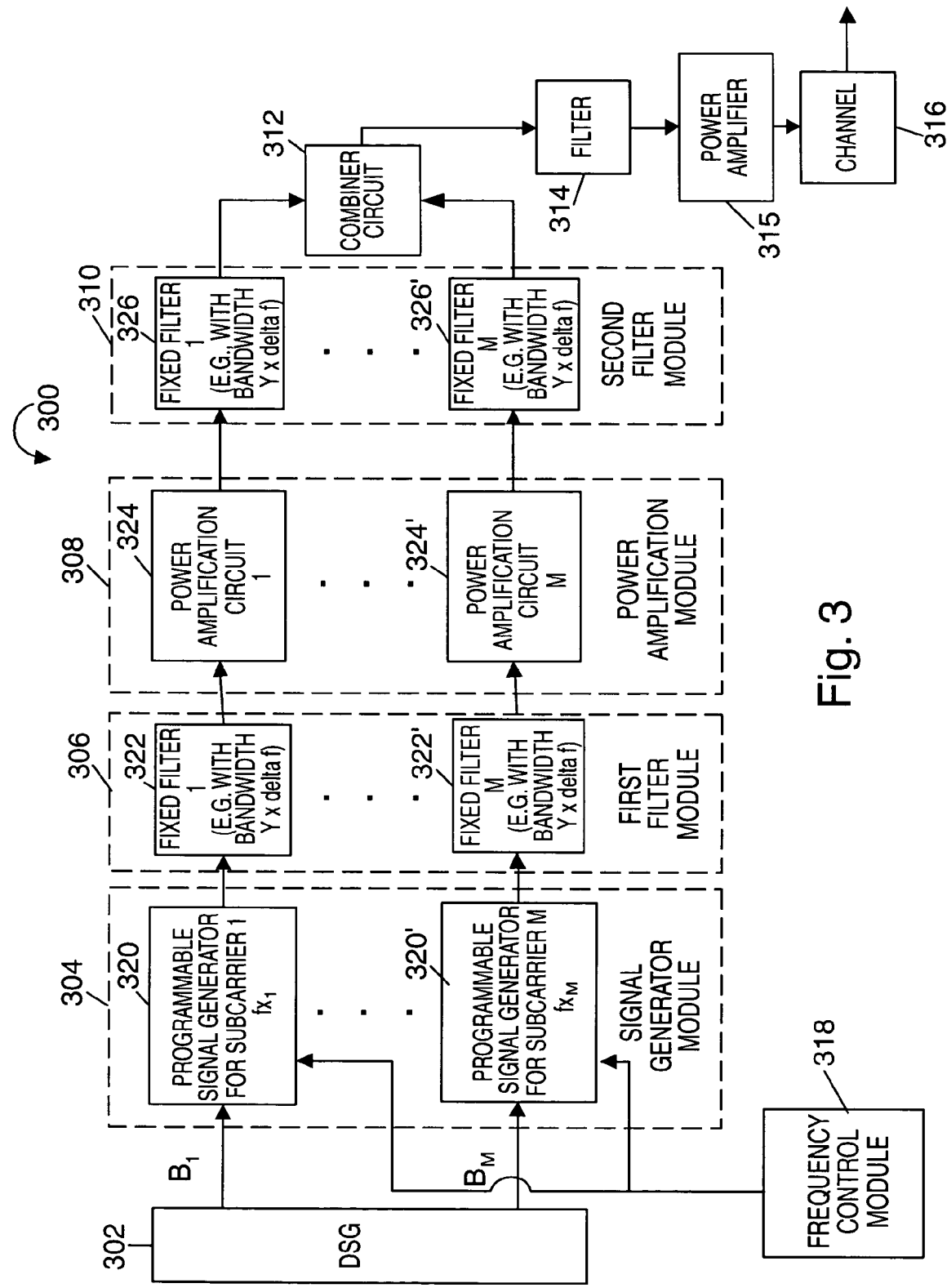
FIG. 3 illustrates an exemplary frequency hopping transmission system for generating and transmitting OFDM signals utilizing a frequency control module, programmable signal generators, and fixed filters at least some of which have the same passbands despite corresponding to different subcarrier signal amplification and filtering paths.

FIG. 3 illustrates an exemplary frequency hopping frequency division multiplexer signal generation and transmission system 300 capable of generating and transmitting OFDM signals in accordance with the present invention. The transmission system 300 may be part of an individual mobile device. In accordance with the present invention, an individual mobile device in a cell may be allocated a subset, e.g. M, possible subcarrier frequencies at any given time on which the mobile device can transmit signals. Thus, while mobile devices in a cell may use any of N subcarrier frequencies to transmit data over time, in the exemplary system during any given transmission period, the mobile device may transmit on at most, M subcarrier frequencies, where M<N. The FIG. 3 system 300 includes a Digital Signal Generator (DSG) 302, a signal generator module 304, a first filter module 306, a power amplification module 308, a second filter module 310, a combiner circuit 312, a filter 314, a power amplifier 315, a channel 316, and a frequency control module 318. As illustrated in FIG. 3, information bits to be transmitted on various subcarriers are first mapped to complex OFDM symbols $B_1, \ldots, B_M$, e.g., one symbol per sub-carrier for each symbol period, by the digital symbol generator (DSG) 302. Each OFDM symbol $B_k$ (where $1 \leq k \leq M$) is then modulated to a corresponding sub-carrier $fx_k$ (where $1 \leq k \leq M$) using a corresponding programmable signal generator thereby generating an analog signal for one symbol duration for each subcarrier. The generated subcarrier signals may be sinusoidal signals. Each subcarrier signal is separately processed via a separate subcarrier processing path, each of which includes at least one amplifier and one corresponding filter. OFDM symbol $B_1$ is modulated to subcarrier $fx_1$ by programmable sinusoid generator for subcarrier 1 $fx_1$ 320 of signal generator module 304; while OFDM symbol $B_M$ is modulated to subcarrier $fx_M$ by programmable sinusoid generator for subcarrier M $fx_M$ 320' of signal generator module 304. The symbol duration is equal to the inverse of the spacing between two adjacent sub-carriers, plus the duration of a cyclic prefix portion when present. Each complex OFDM symbol $B_k$ to be transmitted is used to convey information bits to be communicated. Frequency control module 318 is used to control the operation of the programmable sinusoid signal generators 320, 320', as the frequency hopping occurs and the subcarrier frequencies $fx_1$, $fx_M$ assigned to each generator 320, 320', respectively are changed.

First filter module 306 may be placed after the signal generator module 304. First filter module 306 includes M fixed filters, each corresponding to a different subcarrier processing path: fixed filter 1 322, fixed filter M 322'. Each filter 322, 322' receives and filters the output of corresponding programmable sinusoid signal generator 320, 320', respectively, and has a passband at least as wide as $Y_x \Delta f$ where Y is a positive value greater than 1 but not necessarily an integer and $\Delta f$ is the average frequency spacing between individual ones of the N allowable subcarriers frequencies. Where subcarrier frequencies are uniformly spaced, the average subcarrier spacing will equal the frequency separation between subcarriers.

In one embodiment of the present invention, each filter 322, 322' has a passband at least as wide as N times the frequency spacing between subcarrier frequencies (N× delta f) or (N$\Delta f$). Such a wide filter allows subcarrier amplification and filtering path to be used with any one of the N subcarrier frequencies which may need to be supported. Such an approach is particularly well suited for use with OFDM implementations since the individual subcarrier frequencies do not interfere significantly with one another. By using fixed filters 322, 322' having passbands corresponding to N times the subcarrier signal spacing delta f (N$\Delta f$), the manufacturing and implementation advantages of using fixed filters on subcarrier signal amplification and filtering paths can be obtained without limiting the subcarrier signal paths to a particular subcarrier frequency. Using the same design for filters 322, 322' provides for design and implementation simplicity along with the associated potential cost savings. This novel approach of wide common fixed filters 322, 322' is possible and advantageous because of the unique characteristics of OFDM signaling, the implementation of a frequency hopping system, and the ability to know the maximum bandwidth required for the N supported tones. As the subcarrier frequency (e.g. $fx_1$ of programmable generator 320 is changed), due to frequency hopping, the filter used (e.g. fixed filter 1 322 with bandwidth N$\Delta f$) need not be changed.

In another embodiment of the present invention, where providing the subcarrier filters 322, 322' with a passband N$\Delta f$ wide would provide insufficient filtering, Y is selected to be less than N. In such a case, a fixed filter with a passband at least Y$\Delta f$ wide is provided for each of the subcarriers, with the individual filter's passband being centered, for a given subcarrier path, at the center of the band of subcarrier frequencies which may be transmitted over the subcarrier signal path. In such an embodiment, various subcarrier filters 320, 320' are provided with different center frequencies but each fixed filter 322, 322' is able to pass multiple subcarrier frequencies. This allows the programmable signal generator 320, 320' associated with the signal path to be changed from one subcarrier frequency to another, within limits imposed by the corresponding filter bandwidth (Y$\Delta f$), while avoiding the need for, and cost of, programmable filters. In such an embodiment, frequency control module 318 selectively controls generator 320 so that subcarrier frequency $fx_1$ will remain within the acceptable frequency passband corresponding to the range of fixed filter 1 322. Similarly, frequency control module 318 would selectively program or limit generator 320' to generate subcarrier frequencies $fx_M$ within the passband frequency range of fixed filter M 322'.

In one particular embodiment, Y is equal to N divided by the number of M. In another embodiment of the invention, the total required passband $N\Delta f$ may be divided into subsets of passbands of varying bandwidth; each fixed filter 322, 322' may have an associated bandwidth $Y_1\Delta f$, $Y_M\Delta f$, where $\Sigma_{k=1}^{M} Y_k \Delta f = N\Delta f$. In other embodiments there may be redundant or overlapping passbands for the fixed filters 322, 322' where the total sum coverage is at least $N\Delta f$.

The outputs from the first fixed filter module 306 are input to the power amplification module 308. Power amplification module 308 includes M power amplification circuits 324, 324' one per subcarrier processing path. Power amplification circuits 324, 324' may include linear and/or non-linear stages. Power amplification circuits 1,M (324, 324') correspond to and amplify the signal from first fixed filters 1, N (322, 322'), respectively. The outputs from the power amplification module 308, are input to the second fixed filter module 310. Second fixed filter module 310 includes M fixed filters: fixed filter 1 326, fixed filter M 326'. The filters 326, 326' of the second filter module 310 are similar to the filters 322, 322' of the first filter module 306. The rationale and possible embodiments (previously described) for the filter selection in first filter module 306 also applies to the filter selection in second filter module 310. Each filter 326, 326' receives and filters the output of corresponding power amplification circuit 324, 324'. The filtered analog power amplified sub-carrier signals that are output from the second filter module 310 are added by one or more combining devices, e.g., analog multiplexers, which are used to implement combiner circuit 312. The combined signal generated by combiner circuit 312, is passed through an additional filter 314 and a power amplifier 315 and then transmitted over the communication channel 316.

Figure 4:
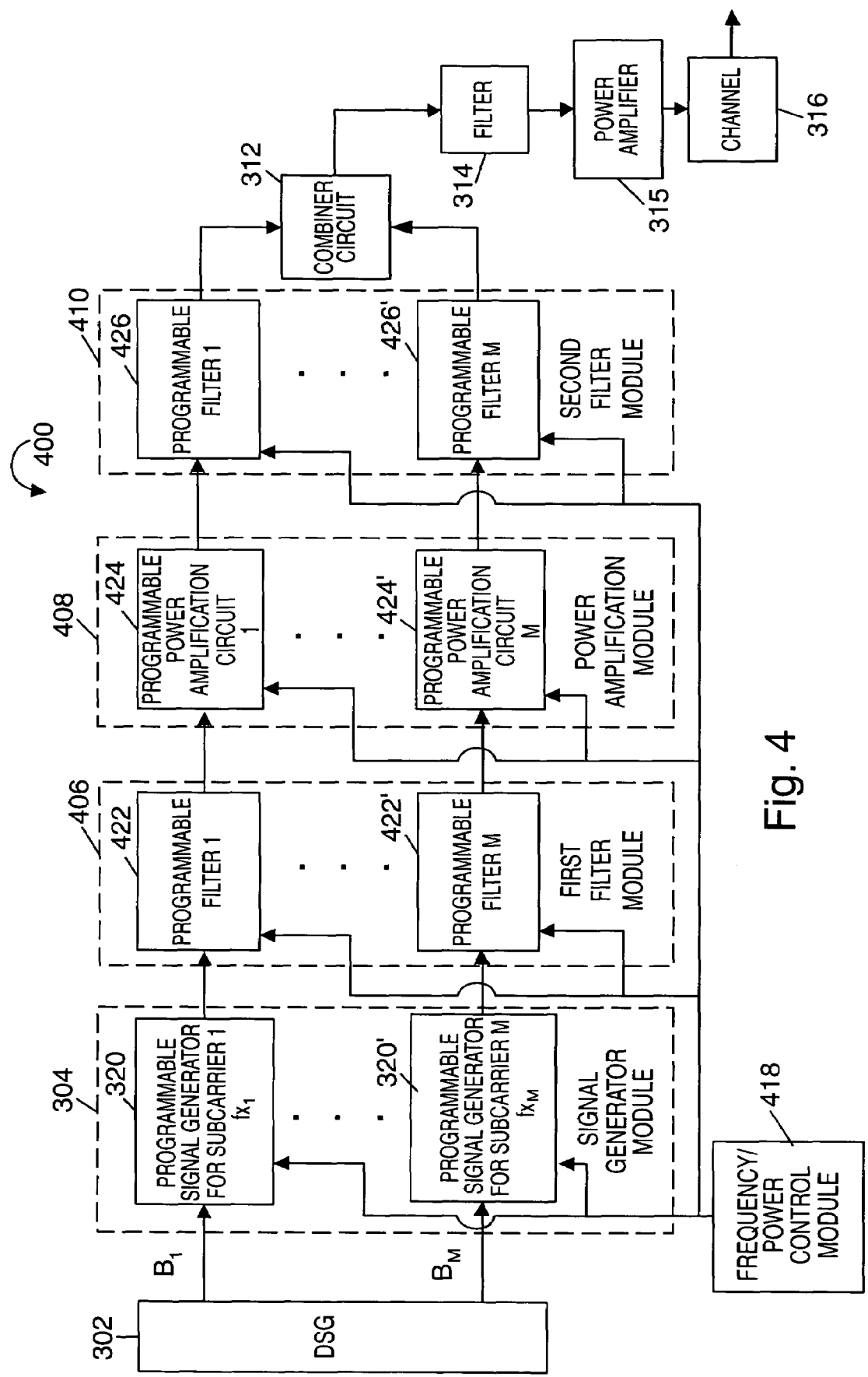
FIG. 4 illustrates an exemplary frequency hopping system for generating and transmitting OFDM signals utilizing a frequency control module, programmable signal generators for subcarrier frequencies, programmable filters and programmable power amplification circuits in accordance with another embodiment of the present invention.

FIG. 4 illustrates another exemplary frequency hopping frequency division multiplexer signal generation and transmission system 400 capable of generating and transmitting OFDM signals in accordance with another embodiment of the present invention. The exemplary system 400 of FIG. 4 is similar to the exemplary system 300 of FIG. 3 in several aspects. For purposes of brevity, the differences between FIG. 3 and FIG. 4 shall be described. System 400 includes a first filter module 406, a power amplification circuit 408, a second filter module 410, and a frequency control module 418 of FIG. 4 instead of the first filter module 306, power amplification module 308, second filter module 310, and frequency control module 318 of FIG. 3. Filter module 406 includes M programmable filters 422, 422'. Similarly, second filter module 410 includes M programmable filters 426, 426'. Power amplification module 408 includes M programmable power amplification circuits 424, 424'. Frequency power control module 418 controls the programmable filters (422, 422') and (426, 426') of first and second filter modules (406, 410) in addition to controlling the programmable sinusoidal signal generators for subcarriers (320, 320') of the signal generator module 304, and the programmable power amplification modules (424, 424') of the power amplification module 408. Exemplary system 400 has the advantage that as frequency hopping occurs (e.g. $fx_1$ of programmable signal generator for subcarrier 1 is changed), the corresponding filters (e.g., programmable filter 1 422 of first filter module 406, power amplification circuit 1 424 of power amplification module 408, and programmable filter 1 426 of second filter module 410) can be changed to optimize filtering and amplification for the current sinusoidal subcarrier frequencies being used.

Thus, filter bandwith (passband) can be kept at or slightly larger than $\Delta f$, or at some other suitable bandwidth, with the center frequency of each filter being charged as the subcarrier frequency associated with the filter is charged.

Figure 5:
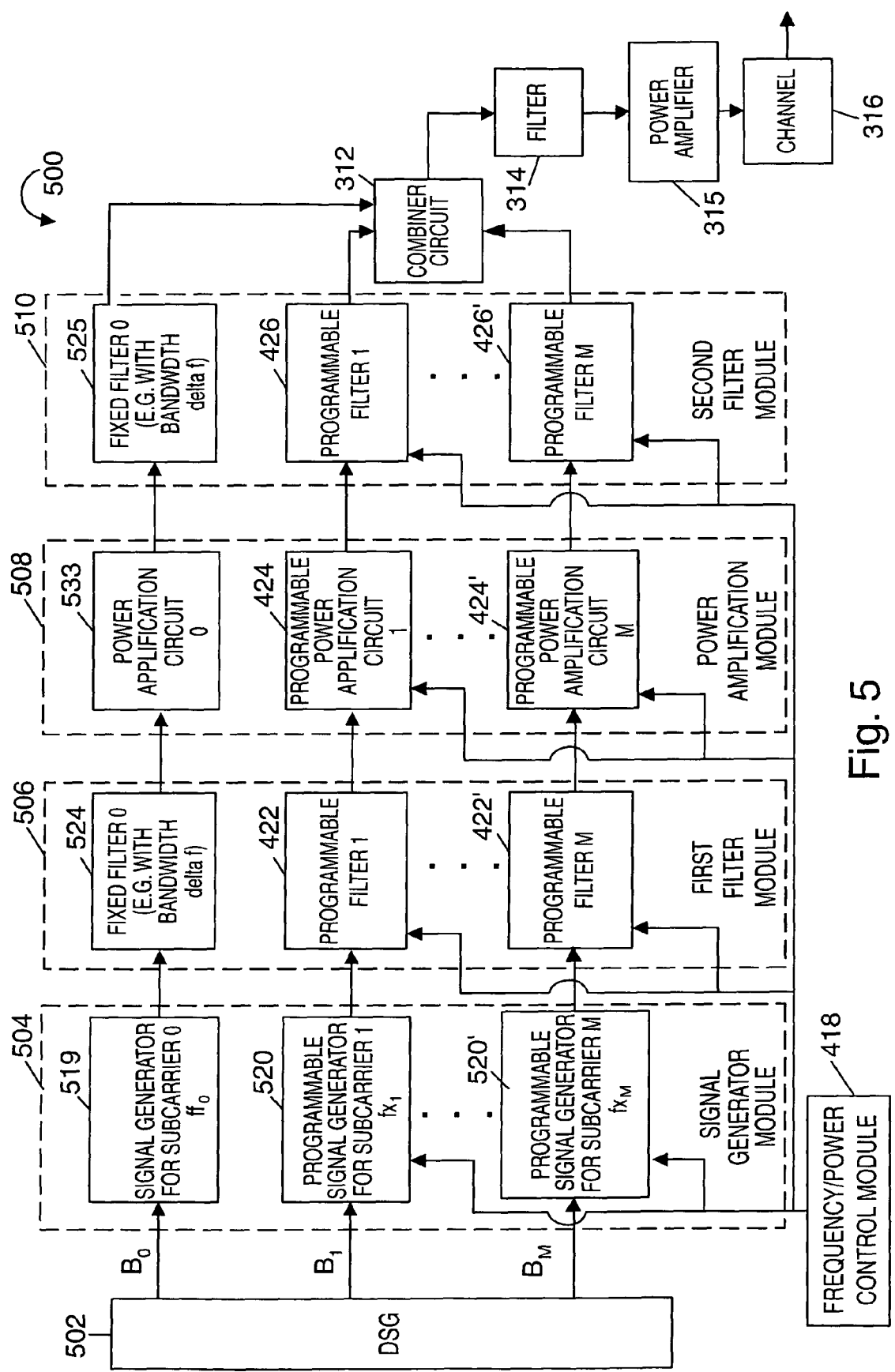
FIG. 5 illustrates an exemplary frequency hopping system which uses a combination of fixed and programmable filters.

FIG. 5 illustrates an exemplary frequency hopping frequency division multiplexer signal generation and transmission system 500 capable of generating and transmitting OFDM signals in accordance with another embodiment present invention. FIG. 5 shows an exemplary case where a combination of fixed and programmable filters may be used in accordance with the invention. The FIG. 5 system 500 includes a Digital Signal Generator (DSG) 502, a signal generator module 504, a first filter module 506, a power amplification module 508, a second filter module 510, a combiner circuit 312, a filter 314, a power amplifier 315, a channel 316, and a frequency control module 418. The signal generator module 504 includes a sinusoidal signal generator 519 for subcarrier 0 ($ff_0$), which corresponds to fixed frequency $f_0$, and M programmable sinusoidal signal generators: a programmable sinusoidal signal generator for subcarrier 1 $fx_1$ 320, a programmable sinusoidal signal generator for subcarrier M $fx_M$ 320'. The first filter module 506 includes a fixed filter 0 524 and M programmable filters: Programmable filter 1 422, programmable filter M 422'. Power amplication module 508 includes a power amplification circuit 0 533 and M programmable power amplification circuits: power amplification circuit 1 424, power amplification circuit M 424'. The second filter module 510 includes a fixed filter 0 525 and M programmable filters: Programmable filter 1 426, programmable filter M 426'.

DSG 502 generates complex OFDM signals $B_1$ through $B_M$, may be subjected to tone (frequency) hopping, and are processed through programmable generators (520, 520'), programmable first filters (422, 422'), programmable power amplification circuits (424, 424'), and programmable second filters (426, 426') which are the same as, or similar to, those of the FIG. 4 system. DSG 502 also generates complex OFDM signal $B_0$. $B_0$ may correspond to a control channel which uses a fixed frequency (subcarrier $ff_0$) and is not subject to frequency (tone) hopping. The sinusoidal signal generator for subcarrier 0 $ff_0$ 519 processes the signal $B_0$. The output signal goes through fixed filter 0 525 (e.g., with bandwith $\Delta f$), through power amplification circuit 0 533, and through fixed filter 0 (e.g., with bandwidth $\Delta f$). Note bandwidth $\Delta f$ of fixed filters 524, 525, is selected to bandpass signals corresponding to subcarrier $ff_0$. The resulting output signal from fixed filter 525 enters the combiner circuit 312. In the above-described manner, fixed filters may be used in combination with programmable filters on a different subcarrier signal path providing a device that is both cost effective and flexible enough to support fixed frequency control channels and frequency hopping used to implement data channels.

While various exemplary embodiments have been described in regard to FIGS. 4 and 5, numerous variations are possible while remaining within the scope of the present invention. For example, the first filter module may include fixed filters with Bandwidth $N\Delta f$ (322, 322') while the second filter module may include programmable style filters (426, 426') or vise versa. In addition, a single set of filters, on filter per subcarrier processing path may be used.

In addition, it should be noted that linear power amplifiers may be used to amplify some subcarrier signals with non-linear amplifiers being used to amplify other subcarrier signals. Alternatively, a combination of linear and non-linear amplifiers may be used to amplify an individual subcarrier signal.

Figure 6:
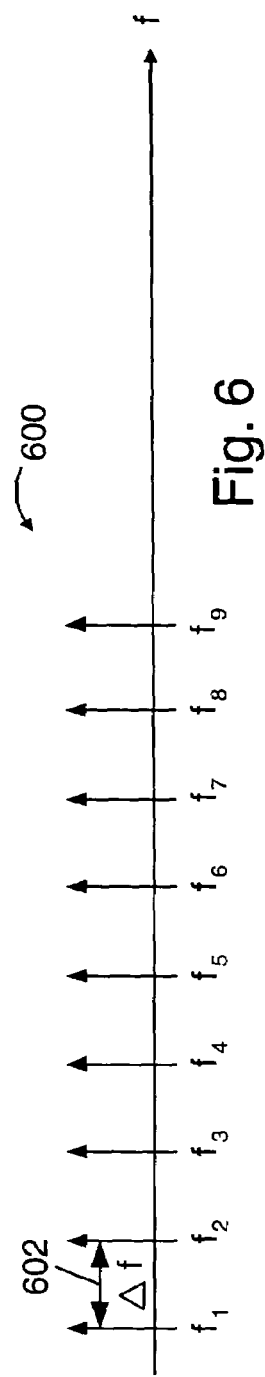
FIGS. 6, 7 and 8 illustrate diagrams which show how N different tones can be used and filtered in accordance with various embodiments of the invention.

The usefulness of various embodiments of the present invention can be appreciated further by considering the two diagrams 600, 602 of FIG. 6 and an exemplary mobile device. Diagram 602 illustrates an exemplary frequency spectrum including 9 subcarrier frequencies, e.g., tones, $f_1$ through $f_9$. Different subsets of the 9 subcarrier frequencies can be used by the exemplary mobile device during different time periods to transmit information, e.g., to a base station of a wireless communications cell. For purposes of explaining the advantages of the fixed filter embodiments of the invention, it will be assumed that the exemplary mobile device uses a first set of 3 (M=3) subcarrier frequencies, out of the 9 possible subcarrier frequencies (N=9), to transmit information at a first point in time and a different second set of 3 subcarrier frequencies at a different point in time.

In accordance with various embodiments of the present invention, the subcarrier frequencies are selected such that the total frequency range covered by the subcarriers (e.g., $N\Delta f$) is a fraction of the main carrier frequency. For example, assume for purposes of discussion, a 1 GHz main carrier frequency and a subcarrier frequency spacing $\Delta f$ of 10 KHz. In the example of the 9 subcarriers provided in FIG. 6, the individual subcarrier frequencies may be as follows:

$f_k$=carrier frequency+$k(\Delta f)$, where k represents the subcarrier number and $\Delta f$ is the subcarrier frequency offset assuming a carrier frequency of 1 GHz and a subcarrier offset of 10 KHz, we have:

f1=1 GHz+10 kHz
f2=1 GHz+20 kHz
f3=1 GHz+30 kHz
f4=1 GHz+40 kHz
f5=1 GHz+50 kHz
f6=1 GHz+60 kHz
f7=1 GHz+70 kHz
f8=1 GHz+80 kHz
f9=1 GHz+90 kHz

While the 9 subcarrier frequencies are shown as being positively offset from the carrier frequency of 1 GHz, commonly the subcarriers are centered around the carrier frequency with some of the subcarriers being offset by a negative multiple of $\Delta f$.

Mathematically, a pulse of frequency $f_k$ can be decomposed into:

$$S(t) = \sum_{i=1}^{\infty} h_i \exp(\sqrt{-1} \cdot i \cdot f_k \cdot t)$$

where $h_i$ is a complex number.

That is, the on/off signal is the sum of sinusoids at fk, 2fk, 3fk, . . . Note that fk is around 1 GHz in our exemplary implementation. Therefore 2fk (the second order harmonic) will be around 2 GHz. Therefore, in the case of an OFDM signal where subcarriers do not interfere with one another one can use a passband filter whose bandwidth can be quite wide, e.g., having a passband as wide as: N times the frequency difference between subcarriers, the carrier frequency (1 GHz in the example) or even wider than the carrier frequency so long as the filter remains sufficiently narrow to reject the higher order harmonics corresponding to the individual subcarries, e.g., frequencies $2f_1, 2f_2, \ldots, 2f_N$, etc.

Figure 7:
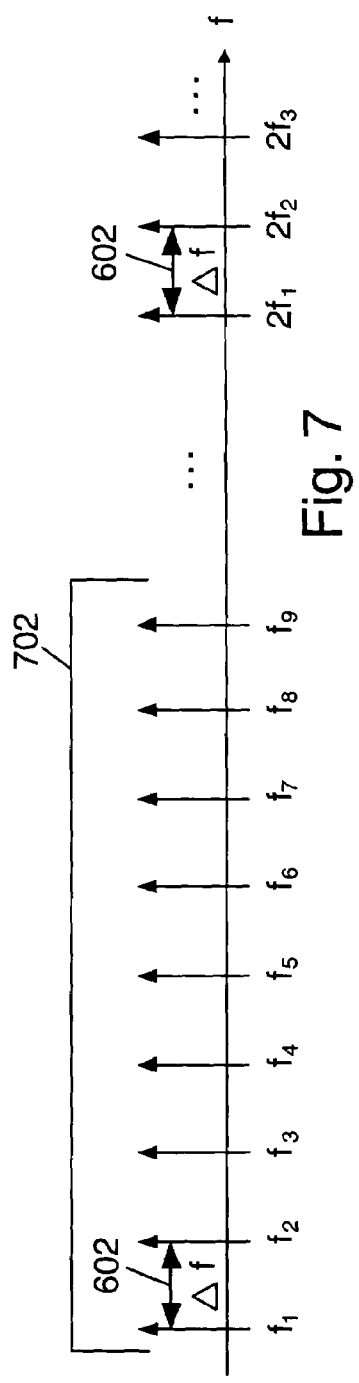

Accordingly, in various OFDM embodiments of the invention, it is possible to use the same filter on each of the M subcarrier signal processing paths where the filter has a bandwidth at least as wide as the frequency range covered by the subcarrier signals and, in some implementations as wide or wider than the frequency of the carrier signal associated the subcarriers. In such embodiments, the filter is still selected narrow enough to reject the second order harmonic of any one of the N subcarrier signals. FIG. 7 shows one such embodiment wherein the same filter is used on each of M signal subcarrier amplification and filtering processing paths, the filtering having a bandwidth 702 which is wide enough to pass each of the subcarriers f1 through f9 while rejecting the higher order harmonics 2f1 through 2fN. In the FIG. 7 example, assuming a 1 GHz carrier frequency, the passpand 702 may be, e.g., 1 GHz.

Figure 8:
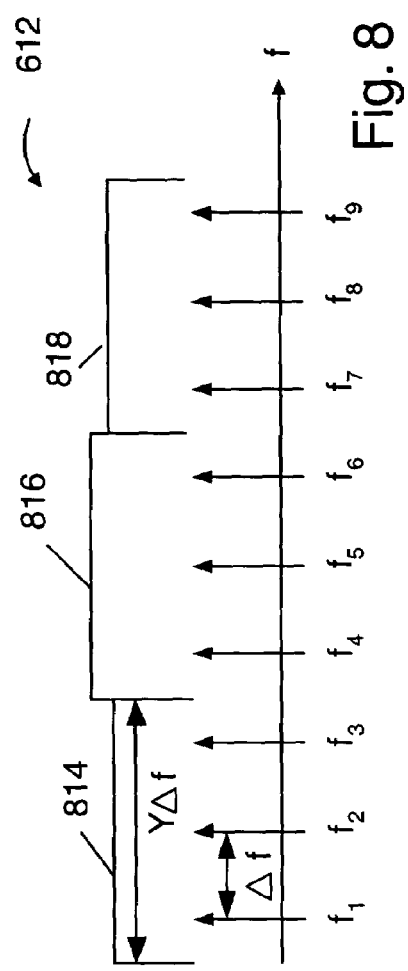

In the case of the FIG. 8 example, where the filter bandwidth will pass each of the possible subcarrier frequencies, frequency hopping can occur without concern for a filter on a particular signal path interfering with transmission of the subcarrier signal regardless of which subcarrier frequency is selected.

FIG. 8 illustrates an example suitable for a wide range of frequency division multiplexed applications, including OFDM applications, where M different fixed filters with different fixed filter bandwidths 814, 816, 818 are used, one per each of m different subcarrier processing paths at any given time where, as in the other examples M=3 and N=9.

In the case of the FIG. 8 example, the frequency/power control module 418 is used to determine which set of subcarrier frequencies is used at any given time and the power to be used by the subcarrier signal. Thus, subcarrier power can be changed, e.g., depending on the frequency. In the FIG. 8 example, the N tones are uniformly spaced with the average distance between the fixed distance between tones $\Delta f$ 602. In such an embodiment, where M=3, the exemplary mobile communications device would normally include 3 subcarrier signal processing paths, one corresponding to each of the three subcarrier signals.

In the FIG. 7 example, fixed filters having a small passband, e.g., a passband which is equal to a multiple, e.g., Y, of the average spacing between subcarrier frequencies in the set of N frequencies is used, where the multiple is less than N. Such embodiments may be useful in frequency hopping systems, e.g., non-OFDM systems where certain subcarriers may interfere with each other when used by the same mobile device at the same time.

As shown in diagram 812, it is possible to select Y which determines the individual filter bandwith as a multiple of $\Delta f$ so that the passband 814, 816, 818 of the filters corresponding to different subcarrier signal paths is a multiple of $\Delta f$ but not so large as to loose the benefit of signal filtering or the ability to exclude the signal corresponding to the next nearest neighboring subcarrier that may be used by the device at any given time. For example, assume that passbands 814, 816, 818 correspond to three different subcarrier signal filters located on different subcarrier signal paths. The frequencies transmitted on each signal path may, and sometimes are, hopped within the limit of the bandwidth of the filter on the corresponding signal path while still being able to filter out other subcarrier signals being used by the exemplary mobile device at the same time. For example, the first subcarrier frequency corresponding to the first of three signal paths can be hopped in the FIG. 8 example between f1, f2 and f3, the second subcarrier can frequency can be hopped between f4, f5 and f6, and the third subcarrier can be hopped between f7, f8 and f9 without being affected by the use of fixed filters having a bandwidth that is 3 times, or approximately three times, $\Delta f$.

It should be appreciated that the particular location of the filter in each subcarrier signal path relative to the amplifier on the subcarrier signal path can vary depending on the implementation. Filtering may be performed prior to subcarrier signal amplification, after subcarrier signal amplification, or both prior to and after subcarrier signal amplification.

Numerous additional variations on the methods and apparatus of the present invention described above will be apparent to those skilled in the art in view of the above description of the invention. Such variations are to be considered within the scope of the invention.

For example, while programmable sinusoidal signal generators are described in the context of the FIG. 3 and 4 exemplary embodiments, it signal to be understood that these programmable signal generators need not be limited to sinusoidal signal generators and in various embodiments other types of programmable signal generators are used. For example, in one embodiment, the signal generator is a square wave signal generator. While the output of such a squarewave generator may be interpreted as a sum of sinusoids e.g., at fx1, fx1*2, fx*3 and so on, if the filter bandwidth on the corresponding subcarrier signal processing path is smaller than fx1*2, then the output of the filter will exclude the sinusoids with the exception of fx1.

The methods and apparatus of the present invention may be, and in various embodiments are, used with CDMA, orthogonal frequency division multiplexing (OFDM), and/or various other types of communications techniques which may be used to provide wireless communications links between access nodes and mobile devices. In various embodiments the mobile devices are implemented as notebook computers, personal data assistants (PDAs), or other portable devices including receiver/transmitter circuits and logic and/or routines, for implementing the methods of the present invention.

The techniques of the present invention may be implemented using software, hardware and/or a combination of software and hardware. The present invention is directed to apparatus, e.g., mobile devices such as mobile terminals that implement one or more methods of the present invention. It is also directed to the methods of the invention. The present invention is also directed to machine readable medium, e.g., ROM, RAM, CDs, hard discs, etc., which include machine readable instructions for controlling a machine to implement one or more steps in accordance with method of the present invention.

What is claimed is:

1. A frequency hopping communications device for transmitting signals on a plurality of M subcarrier signals in parallel, each of said M subcarrier signals corresponding to a different one of M subcarrier signal frequencies, said M subcarrier signal frequencies being a subset of N subcarrier frequencies on which said communications device may transmit signals over time, where M and N are positive integers and where M<N, said frequency hopping communications device including:
   a frequency control circuit for controlling which of the N subcarrier frequencies are generated and used by said device for the transmission of signals;
   a plurality of M separate subcarrier signals paths operating in parallel, each of the M subcarrier signal paths including a programmable signal generator coupled to said frequency control circuit, a power amplification circuit and a filter circuit, said programmable signal generator for generating a subcarrier signal determined by said frequency control circuit and having a subcarrier frequency corresponding to said subcarrier signal path to which said signal generator corresponds, wherein each of the M signal filter circuits, that each correspond to a different one of said M separate subcarrier signal paths, is a fixed filter, at least one of the M fixed filters having a passband bandwidth at least equal to Y times the average frequency spacing between the N frequencies that said device can use as the N subcarrier frequencies, where Y is a positive number greater than 1; and
   a combining circuit for combining analog subcarrier signals corresponding to different subcarrier signal paths prior to transmission.

2. The device of claim 1, wherein Y>N divided by M.

3. The device of claim 1, wherein Y is at least as large as N.

4. The device of claim 1, wherein each of said M signal filter circuits are identical fixed filters each having a passband bandwidth covering the full set of N subcarrier signal frequencies which may be used by said device.

5. The device of claim 4, wherein the M subcarrier signals are OFDM subcarrier signals and where the N subcarrier frequencies are evenly spaced frequencies.

6. The device of claim 1, wherein the fixed filter included on each of said M separate subcarrier signal paths is positioned in series with said corresponding power amplification circuit either before or after the corresponding power amplification circuit.

7. The device of claim 6,
   wherein the programmable signal generator included in each subcarrier signal path generates an analog subcarrier signal; and
   wherein said power amplification circuit and said filter circuit included in each subcarrier signal path are analog circuits.

8. The device of claim 1, wherein each of the M signal filter circuits, that each correspond to a different one of said M separate subcarrier signal paths, is a programmable filter.

9. The device of claim 8, wherein each of the M programmable filters has a passband corresponding to the subcarrier signal frequency of the subcarrier signal generated by the programmable signal generator circuit included on the same subcarrier signal path as the programmable filter.

10. The device of claim 9, wherein the programmable filters have a passband which has a bandwidth sufficient to pass said subcarrier signal but reject the nearest neighboring one, in frequency, of said N subcarrier signals.

11. The device of claim 8, wherein said device further transmits information using at least one additional preselected subcarrier frequency, the device further comprising:
   an additional subcarrier signal path including an amplifier and fixed filter for amplifying and filtering a subcarrier signal corresponding to said additional preselected subcarrier frequency.

12. The device of claim 11, where said additional subcarrier frequency corresponds to a control channel used to transmit control information.

13. A frequency hopping communication method for use in a communications system wherein a device can transmit information using M subcarrier signals at a time, each of the M subcarrier signals corresponding to a different subcarrier frequency, where M and N are positive integers and where M is less than N and where N is the total number of different subcarrier frequencies said device can use over time, the method comprising:
   i) operating M programmable signal generators to generate said M subcarrier signals;
   ii) separately processing each of the M subcarrier signals to produce M processed subcarrier signals, the processing of each of said M subcarrier signals including an amplification operation and a filtering operation, said separate processing thus including M separate filtering operations, said M separate filtering operations are performed using M separate fixed filters, at least one of the M fixed filters having a bandwidth at least equal to Y times the average frequency spacing between the N frequencies that said device can use as the N subcarrier frequencies, where Y is a positive number greater than 1;

iii) combining the M processed subcarrier signals to generate a frequency division multiplexed transmission signal;

iv) controlling at least one of said M programmable signal generators to change the frequency of the subcarrier signal generated by said at least one programmable signal generator; and v) repeating steps (i), (ii), and (iii).

14. The method of claim 13, wherein said M subcarrier signals are analog signals and wherein said filtering operation is an analog filtering operation.

15. The method of claim 13, wherein Y>N divided by M.

16. The method of claim 13, wherein Y is equal to or greater than N.

17. The method of claim 14, wherein said M separate filtering operations are performed using identical fixed filters each having a bandwidth covering the full set of N subcarrier signal frequencies which may be used by said device.

18. The method of claim 17, wherein the N subcarrier signals are OFDM subcarrier signals.

19. The method of claim 13, wherein said M separate filtering operations are performed using M separate programmable filters, the frequency of each of each of the M programmable filters corresponding to the frequency of the subcarrier signal being filtered.

20. The method of claim 13, further comprising:
changing the amount of power amplification performed on one of the M subcarrier signals when the frequency of said subcarrier signal is changed.

21. The method of claim 13, wherein controlling at least one of said M programmable signal generators to change the frequency of the subcarrier signal includes:
operating said M programmable generators to switch from generating a first set of M subcarrier signals corresponding to a first set of M uniformly spaced subcarrier frequencies to generating a second set of M subcarrier signals corresponding to a second set of M uniformly spaced subcarrier frequencies, a first subcarrier frequency in said first set of M subcarrier frequencies being separated from a first subcarrier frequency in said second set of M subcarrier frequencies by a frequency spacing that is less than Y times the frequency spacing between subcarrier signals in said first and second sets of M subcarrier signals.

22. A frequency hopping communications device for transmitting signals on a plurality of M subcarrier signals in parallel, each of said M subcarrier signals corresponding to a different one of M subcarrier signal frequencies, said M subcarrier signal frequencies being a subset of N subcarrier frequencies on which said communications device may transmit signals over time, where M and N are integers and where M<N, said frequency hopping communications device including:
frequency control means for controlling which of the N subcarrier frequencies are generated and used by said device for the transmission of signals;
a plurality of M separate subcarrier signals paths operating in parallel, each of the M subcarrier signal paths including a programmable signal generator means for generating a corresponding one of the M subcarrier signals, power amplification means for amplifying the corresponding one of the M subcarrier signals and filter means for filtering the corresponding one of the M subcarrier signals, said programmable signal generator means generating a subcarrier signal determined by said frequency control means and having a subcarrier frequency corresponding to said subcarrier signal path to which said signal generator corresponds, wherein each of the M signal filter means is a fixed filter, at least one of the M fixed filters having a passband bandwidth at least equal to Y times the average frequency spacing between the N frequencies that said device can use as the N subcarrier frequencies, where Y is a positive number greater than 1; and
combining means for combining analog subcarrier signals corresponding to different subcarrier signal paths prior to transmission.

23. The device of claim 22, wherein Y>N divided by M.

24. The device of claim 22, wherein Y is at least as large as N.

25. The device of claim 22, wherein each of said M signal filter means are identical fixed filters each having a passband bandwidth covering the full set of N subcarrier signal frequencies which may be used by said device.

26. A computer readable medium embodying machine executable instructions for controlling a communications device to implement the steps of a frequency hopping communication method, the method being for use in a communications system wherein a device can transmit information using M subcarrier signals at a time, each of the M subcarrier signals corresponding to a different subcarrier frequency, wherein M and N are integers and where M is less than N and where N is the total number of different subcarrier frequencies said device can use over time, the method comprising the steps of:

i) operating M programmable signal generators to generate said M subcarrier signals;

ii) separately processing each of the M subcarrier signals to produce M processed subcarrier signals, the processing of each of said M subcarrier signals including an amplification operation and a filtering operation, said separate processing thus including M separate filtering operations, said M separate filtering operations are performed using M separate fixed filters, at least one of the M fixed filters having a bandwidth at least equal to Y times the average frequency spacing between the N frequencies that said device can use as the N subcarrier frequencies, where Y is a positive number greater than 1;

iii) combining the M processed subcarrier signals to generate a frequency division multiplexed transmission signal;

iv) controlling at least one of said M programmable signal generators to change the frequency of the subcarrier signal generated by said at least one programmable signal generator; and v) repeating steps (i), (ii), and (iii).

* * * * *

UNITED STATES PATENT AND TRADEMARK OFFICE
CERTIFICATE OF CORRECTION

| | | |
|---|---|---|
| PATENT NO. | : 7,639,728 B2 | Page 1 of 1 |
| APPLICATION NO. | : 10/616143 | |
| DATED | : December 29, 2009 | |
| INVENTOR(S) | : Laroia et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1716 days.

Signed and Sealed this

Twenty-first Day of December, 2010

David J. Kappos
*Director of the United States Patent and Trademark Office*